(12) United States Patent
Blair et al.

(10) Patent No.: US 12,393,480 B2
(45) Date of Patent: Aug. 19, 2025

(54) RECLAMATION OF MEMORY ECC BITS FOR ERROR TOLERANT NUMBER FORMATS

(71) Applicant: XILINX, INC., San Jose, CA (US)

(72) Inventors: Zachary Blair, San Jose, CA (US); Alireza Khodamoradi, Lafayette, CO (US); Ralph D. Wittig, Menlo Park, CA (US); Eric Dellinger, Longmont, CO (US); Kristof Denolf, Longmont, CO (US)

(73) Assignee: XILINX, INC., San Jose, CA (US)

( * ) Notice: Subject to any disclaimer, the term of this patent is extended or adjusted under 35 U.S.C. 154(b) by 77 days.

(21) Appl. No.: 18/241,163

(22) Filed: Aug. 31, 2023

(65) Prior Publication Data

US 2025/0077329 A1 Mar. 6, 2025

(51) Int. Cl.
*G06F 11/00* (2006.01)
*G06F 11/07* (2006.01)
*G06F 11/10* (2006.01)

(52) U.S. Cl.
CPC ...... *G06F 11/0784* (2013.01); *G06F 11/0787* (2013.01); *G06F 11/1068* (2013.01)

(58) Field of Classification Search
CPC ............ G06F 11/1068; G06F 11/0787; G06F 11/0784
See application file for complete search history.

(56) References Cited

U.S. PATENT DOCUMENTS

2020/0125446 A1* 4/2020 Wang ................ H03M 13/6356
2022/0398036 A1* 12/2022 Sun ........................ G06F 3/0616

* cited by examiner

*Primary Examiner* — Esaw T Abraham
(74) *Attorney, Agent, or Firm* — Patterson + Sheridan, LLP

(57) ABSTRACT

A method for operating a computing system includes determining a baseline accuracy of the computing system based on a baseline data transmission format comprising a baseline quantity of data bits and a baseline quantity of error correction (ECC) bits, determining sample accuracies of the computing system based on sample data transmission formats each including a quantity of data bits and a quantity of ECC bits that are different from the baseline quantity of data bits and the baseline quantity of ECC bits, and storing data in a memory device of the computing system using at least one data transmission format, wherein the at least one data transmission format is selected from a group of data transmission formats comprising the baseline data transmission format and the sample data transmission formats and the at least one data transmission is selected based on the baseline accuracy and the sample accuracies.

14 Claims, 7 Drawing Sheets

RECLAMATION OF MEMORY ECC BITS FOR ERROR TOLERANT NUMBER FORMATS

TECHNICAL FIELD

Examples of the present disclosure generally relate to reclaiming error correction code (ECC) bits of a data transmission to improve accuracy and throughput of a system incorporating memory.

BACKGROUND

Modern memory systems are designed using standard memory protocols. For example, synchronous dynamic random access memory (SDRAM) may be designed using a double data rate (DDR5) standard memory protocol, a high bandwidth memory 3 (HBM3) standard memory protocol, or the like. Standard memory protocols dictate an interface with fixed widths for data, control, and error correction code (ECC) bits. Typically, for memory systems that utilize ECC, error correction is performed at a memory controller that is located at a boundary between a processing device and a memory device of the memory system.

ECC bits are used for detecting and correcting errors in data transmitted over noisy communication channels. For example, ECC bits may be used to detect an error in a data transmission and storage caused by a noisy channel between a memory controller and a memory device of a memory system. ECC bits are redundant data included in a data transmission. The redundancy allows for the detection of errors in the data transmission, and may allow the data transmission to be corrected without retransmission.

SUMMARY

In one or more examples, a method for operating a computing system includes determining a baseline accuracy of the computing system based on a baseline data transmission format, the baseline data transmission format comprising a baseline quantity of data bits and a baseline quantity of error correction (ECC) bits, determining sample accuracies of the computing system based on sample data transmission formats, the sample data transmission formats each including a quantity of data bits and a quantity of ECC bits that are different from the baseline quantity of data bits and the baseline quantity of ECC bits, and storing data in a memory device of the computing system using at least one data transmission format, wherein the at least one data transmission format is selected from a group of data transmission formats comprising the baseline data transmission format and the sample data transmission formats and the at least one data transmission is selected based on the baseline accuracy and the sample accuracies.

In one or more examples, an integrated circuit device includes a first ECC logic circuitry disposed on a first data path of the integrated circuit device, the first ECC logic circuitry configured to reclaim a portion of error correction (ECC) bits of a data transmission based on a fault tolerance of data bits of the data transmission, and the integrated circuit device is coupled to a memory device and configured to transmit the data transmission to a memory device of a computing system.

In one or more examples, A computing system includes, an integrated circuit device coupled to a memory device, the integrated circuit device comprising a first ECC logic circuitry disposed on a first data path of the integrated circuit device, the first ECC logic circuitry configured to reclaim a portion of error correction (ECC) bits of a data transmission based on a fault tolerance of data bits of the data transmission, and transmit the data transmission to the memory device.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1A:
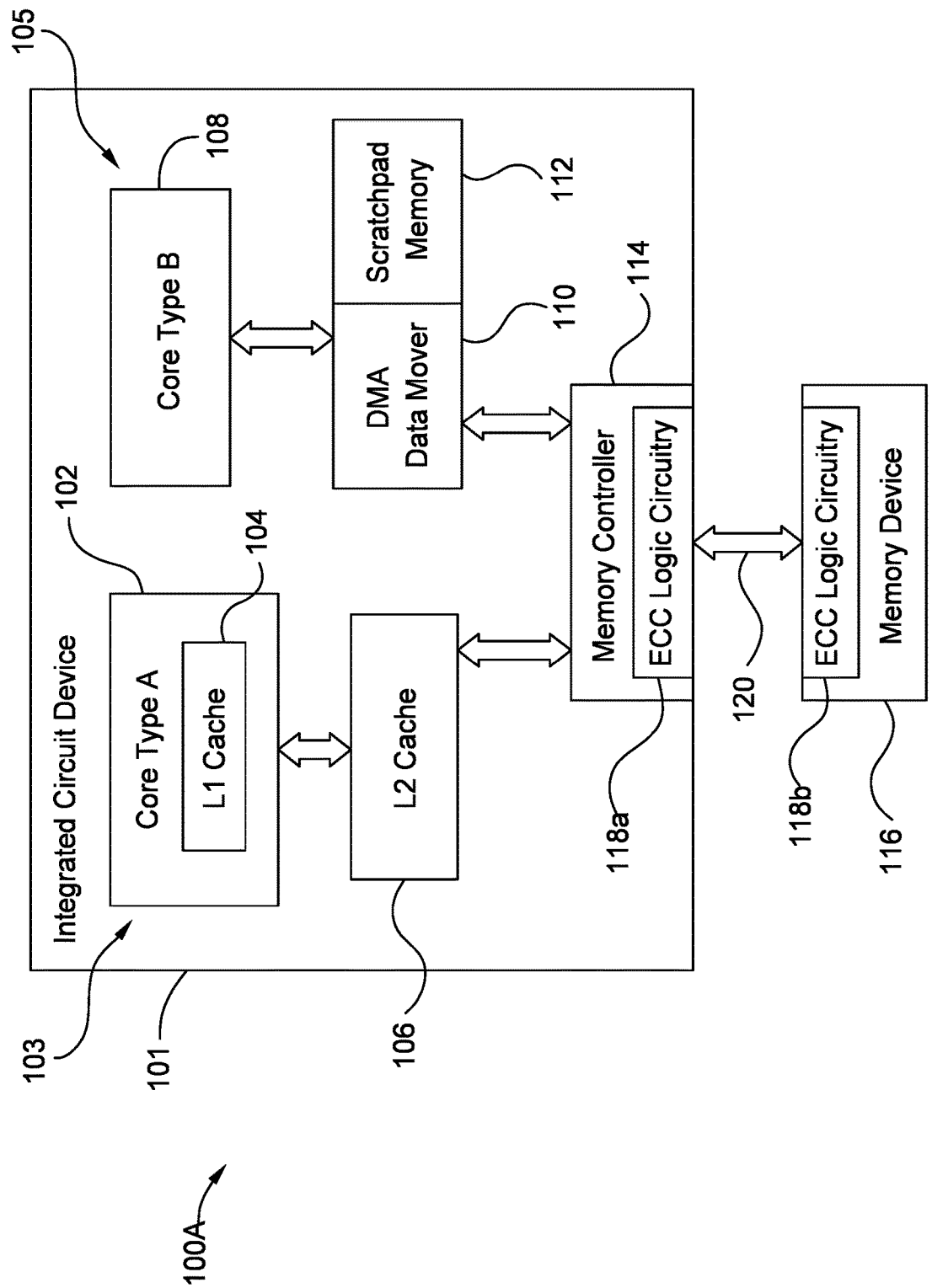
FIG. 1A illustrates an exemplary computing system according to one or more examples.

Modern memory systems may be designed with standardized memory communication protocols. For example, synchronous dynamic random access memory (SDRAM) may be designed using a double data rate (DDR5) standard memory protocol, a high bandwidth memory 3 (HBM3) standard memory protocol, or the like. Standard off-chip memory protocols dictate an interface for data inputs that include a fixed width for error correction code (ECC) bits. In one example, memory protocol requires 8 ECC bits per 64 bits of data. In one or more examples, for memory systems that utilize ECCs, error correction is performed at a memory controller that is located at a boundary between a processing device and a memory device of the memory system.

ECC bits are redundant data included in a data transmission. ECC bits allow for the detection of errors (faults) within the bits of a data transmission. In some examples, ECC bits may allow for a data transmission to be corrected without retransmission.

In different systems that implement a memory system, such as a central processing unit (CPU), a video decoder device, artificial intelligence (AI) coprocessor, or the like, there is a mixed level of data integrity. Stated differently, memory faults or bit errors in some systems can be tolerated, whereas in other systems a memory fault or a bit error may lead to a catastrophic failure. For example, a single bit error in an instruction read from memory into the processor of a CPU may result in a misallocation of data, a jump to an illegal section of code, or a system shutdown, among others. An error in a color value of a pixel in a video decoder may result in an unnoticeable change in a single frame of a video.

In an AI coprocessor, a single bit error can either have no impact on the result of an inference, or may cause an incorrect result.

Fault tolerance may be defined as a mechanism to correct faults (errors) such as ECC bit redundancy schemes, and/or a system's ability to function correctly in the event of incorrect data. For example, a CPU has a lower fault tolerance than the AI coprocessor because a single bit error in a CPU can lead to a catastrophic failure.

In one or more examples, machine learning (ML) systems are statistical models that are evaluated on both performance and accuracy. ML system models may be imperfect and often sacrifice accuracy for throughput. For example, ML learning systems use quantized data types, such as low precision floating point, block floating point, and quantized integer types. ML model weights are quantized to a lower precision format because the ideal signal format is used during training. This introduces quantization noise. In some cases in which floating point data types are used, increasing the mantissa size may reduce the quantization noise by a power of two per additional mantissa bits.

In an ML system without ECC, faults may be present within a memory device or within a channel between the memory device and a memory controller. These faults introduce a different type of randomized noise within a data transmission that depends on the location of the fault. For example, an exponent bit flip will have a significant impact on a magnitude of a value in a data transmission, an upper mantissa bit flip has a limited effect on the randomized noise, and a flip in a lower mantissa bit is negligible. Therefore, there is a tradeoff between data accuracy and error detection. For example, the noise reduction offered by an increase in the number of mantissa bits (improved accuracy) may be greater than the noise introduced through errors from memory faults based on the type of system that implements the memory system.

Embodiments described herein relate to evaluating the fault tolerance of data bits, and based on the fault tolerance of data bits, determining whether to reclaim (replace) ECC bits with data bits for improved precision. In particular, embodiments herein describe determining selectively protecting certain data bits with ECC bits, and/or leaving fault tolerant data bit unprotected based on the noise contributed by hardware characteristics (e.g., bit error rate) and by quantization. Stated differently, embodiments described herein exploit the mixed criticality of data transmissions stored in off-chip memory to improve accuracy or throughput for applications which do not require ECC protection on all data bits. This includes conditional disablement of ECC, wider datapath to propagate ECC bits further inside the compute device, and processors which operate on new number formats. Data transmission formats used in a computing system are selected based on noise contributed by both hardware characteristics (e.g. bit-error rate, BER) and by quantization.

FIG. 1A illustrates an exemplary computing system 100A according to one or more examples. The computing system 100A may be a CPU, an AI coprocessor device, a video decoder device, or the like. The computing system 100A may include an integrated circuit device 101 coupled to a memory device 116. The memory device 116 may be any type of memory device including, but not limited to, a synchronous dynamic random access memory (SDRAM) device, a dynamic random access memory (DRAM) device, a static random access memory (SRAM) device, or the like.

In one example, the integrated circuit device 101 includes a processing core 102, a cache memory 104 disposed within the processing core 102, a cache memory 106, a processing core 108, a data mover circuitry 110, a scratch pad memory device 112, and a memory controller 114. In one example while the processing core 102, the cache memory 104, the cache memory 106, the processing core 108, the data mover circuitry 110, the scratch pad memory device 112, and the memory controller 114 are included in one integrated circuit device, each of these elements can be included in separate integrated circuit devices. For example, the memory controller 114 can be included in a separate integrated circuit device while the other elements are included in the integrated circuit device 101. In another example, the integrated circuit device 101 can include one of more chips with each element on a single chip or each element spread across multiple chips. For example, the memory controller 114 can be included on one chip of the integrated circuit device 101, while the remaining elements are included on a separate chip(s). In one example, data may be transmitted bi-directionally (e.g., via read and write operations) through the integrated circuit device 101 to/from the memory device 116 via two different data paths. A first data path 103 includes the processing core 102, the cache memory 106, and the memory controller 114. A second data path 105 includes the processing core 108, the data mover circuitry 110/the scratch pad memory device 112, and the memory controller 114. Although two data paths are illustrated in the integrated circuit device 101, this is for example purposes only. The integrated circuit device 101 can include any quantity of data paths.

In one example, the processing core 102 and the processing core 108 are different types of cores. In another example, the processing core 102 and the processing core 108 are the same type of core. The processing core 102 and the processing core 108 are processor cores and are configured to generate and write data to the memory device 116, and read data from the memory device 116 via the respective first and second data paths 103 and 105 based on a command from the memory controller 114. For example, the processing core 102 may be a secure core, while the processing core 108 is an unsecure core (or vice versa). In one example, the cache memory 104 is a level 1 (L1) cache that holds data that is used by the processing core 102. In one or more examples, if a read request is issued and the data is stored in the cache memory 104, the data is read from the cache memory 104 instead of the cache memory 106 or the memory device 116. Further, the cache memory 106 is a level 2 (L2) cache that stores data transmission that are effectively copies of data transmissions stored in the memory device 116. For example, if a read request is issued and the data is stored in the cache memory 106, the data is read from the cache memory 106 instead of the memory device 116. In one example, the data mover circuitry 110 is a direct memory access (DMA) data mover. The memory controller 114 is capable of accessing the memory device 116 under control of the data mover circuitry 110. In one example, the scratch pad memory device 112 is a high-speed internal memory that is used for temporary storage of small amounts of data for rapid retrieval by the processing core 108.

In one or more examples, data transmissions have data transmission formats that include a combination of data bits and ECC bits. The ECC bits provide ECC protection to each of the data bits of the corresponding data transmission. In one example, the ECC bits are used to detect an error (e.g., bit flips) in specific data bits of a data transmission. For example, a data transmission that is 72 bits in length may include 64 data bits and 8 ECC bits.

In one example, at least one ECC logic circuitry is included in one device of the integrated circuit device 101. Each ECC logic circuitry adds ECC bits to a data transmission and/or determines whether an error (fault) is present in a data transmission based on each of the ECC data bits. The ECC logic circuitry is used to determine whether an error (fault) in the data bits exists, and in (certain situations) resolve the error. For example, during a write operation, a core, such as the processing core 102 or the processing core 108, generates a data transmission based on a write command from the memory controller 114. Typically, the core generates a data transmission having a data transmission format including data bits which, include but are not limited to, a memory address in memory device, a core ID that identifies which core generated the data transmission, and the like. When the generated data transmission reaches the ECC logic circuitry, the ECC logic circuitry adds ECC bits to the data transmission. In one example, the ECC bits are calculated based on the data bits and are used to detect errors (e.g., bit flips) in the data bits. The ECC bits are stored in the memory device 116 along with the data bits. During a read operation (i.e., a path from the memory device 116 to a core device) each ECC logic circuitry determines whether the data transmission is faulty (i.e., includes an error) and/or fixes the faulty data transmission based on ECC bits that were added to the data transmission. In one example, the ECC bits were added to the data transmission when the data transmission was written to the memory device 116. In one example, the ECC logic circuitry farthest down the path from the memory device 116 to one of the cores, strips the ECC bits from the data transmission if no errors (faults) are detected. In some examples, during a write command in which multiple ECC logic circuitries are included in the integrated circuit device 101, each additional downstream ECC logic circuitry determines whether the data transmission is faulty and/or fixes the faulty data transmission based on the ECC data.

In one example, as illustrated in FIG. 1A, an ECC logic circuitry 118a is included in the memory controller 114 and an ECC logic circuitry 118b is included in the memory device 116. The memory controller 114 and the memory device 116 can split the duties of error correction and detection. In one example, during a read operation, when a data transmission is read from a location in memory of the memory device 116 it may include internal errors (faults). The ECC logic circuitry 118b of the memory device 116 partially fixes the faulty data, and transmits it across a channel 120 to the memory controller 114. The memory controller 114 corrects the remainder of the faulty data using the ECC logic circuitry 118a, strips the ECC bits, and transmits the corrected data transmission through one of the data paths. As noted above, once data passes the last (or only) ECC logic circuitry on a data path, it is assumed the data is correct and the ECC bits are stripped. For example, during a read operation once the data transmission passed ECC logic circuitry 118a of the memory device 116, it is assumed that the data transmission is correct. In another example, the ECC logic circuitry 118b of the memory device 116 can fully correct the faulty data transmission. In yet another example, the ECC logic circuitry 118b of the memory device 116 determines there are too many errors (faults) on the data (e.g., multiple bits are flipped) such that the ECC logic circuitry 118b cannot fix the faulty data, and reports a fault to the memory controller 114.

As explained above, during a read operation, the memory device 116 can transmit a partially corrected or a fully corrected data transmission across the channel 120. In some examples, the channel 120 is noisy and imparts additional errors onto the data. The ECC logic circuitry 118a of the memory controller 114 can determine, based on the ECC bits, whether there is an error present within the data bits of the data transmission. In one example, the ECC logic circuitry 118a of the memory controller 114 can repair the error. In another example, ECC logic circuitry 118a of the memory controller 114 can determine there are too many errors on the data bits and reports a fault to the memory device 116.

In another example, during a write operation, a data transmission is provided along one of the data paths from one of the cores to the memory controller 114. The ECC logic circuitry 118a of the memory controller 114 adds ECC bits to the data transmission and then transmits the data transmission to the memory device 116 via the channel 120. Upon receiving the data transmission, the ECC logic circuitry 118b of the memory device 116 determines whether the received data transmission is faulty (includes an error). In one example, the data transmission can become faulty due to noise in the channel 120. If the ECC logic circuitry 118b of the memory device 116 determines an error, the ECC logic circuitry 118b of the memory device 116 can either fix the error (fault) or determine too many bits are flipped and return an error signal to the memory controller 114. If the ECC logic circuitry 118b of the memory device 116 determines there are not any errors, or fixes the errors, the memory device 116 can write the transmitted data (along with the ECC data) to a memory location of the memory device 116.

As described above, different types of systems in which the integrated circuit device 101 are included within have different levels of data integrity. Stated differently, different systems that implement integrated circuit device 101 are more tolerant to faults. Different data bits in a data transmission can have different fault tolerances. Systems that are more tolerant to faults, such as ML systems for example, may still return the proper result depending on where the error is within the data. In one example, memory throughput of a system that is more tolerant to faults can be improved by allocating less bits of a data transmission to ECC bits (i.e., reclaim ECC bits for data bits). In another example, memory throughput of a system that is more tolerant to faults can be improved by reclaiming all of the ECC bits as data bits. In another example, larger blocks of data transmissions formed of multiple data transmissions could be used, and at least a portion of ECC bits can be reclaimed. The ECC bits used in the larger blocks of data transmissions can be used to check for errors within bits of the blocks of data transmission that have a low fault tolerance while protecting data bits with a high fault tolerance. Determining a fault tolerance of a system, such as system 100, and deciding whether to reclaim ECC bits as data bits based on the fault tolerance of the system, and/or aggregating multiple data transmissions into a block of data that share common ECC bits as described herein, advantageously improves the precision of the data transmission while selectively protecting data bits with low fault tolerances (if any exist). This will be described in more detail below.

As shown in FIGS. 1B-1E, the ECC logic circuitry (i.e., ECC logic circuitry 118a-118f) can be included into one or multiple of the elements of the integrated circuit device 101, so long as at least one ECC logic circuitry is included.

Figure 1B:
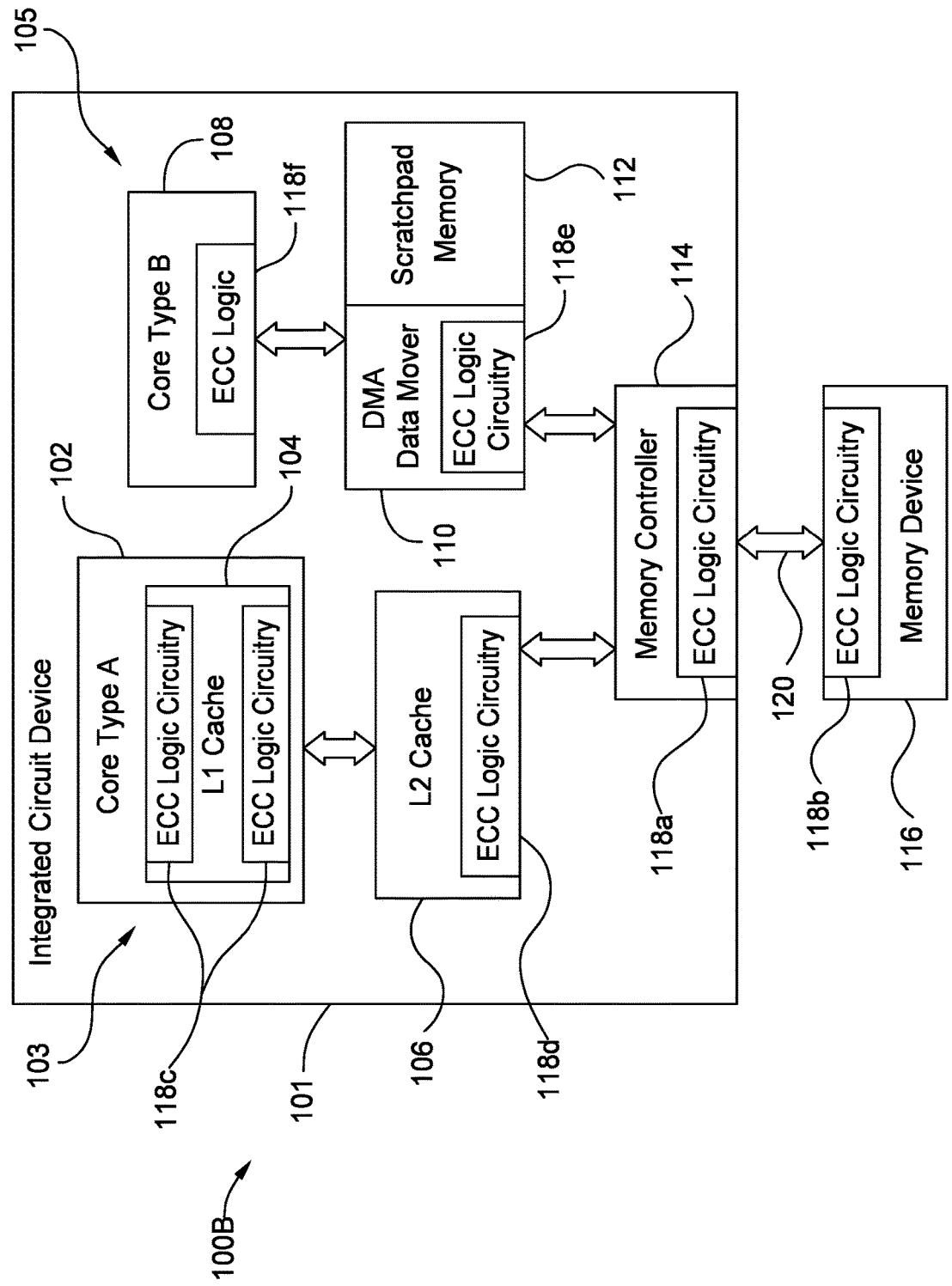
FIG. 1B illustrates an exemplary computing system according to one or more examples.

FIG. 1B illustrates an exemplary computing system 100B according to one or more examples. In one example, the computing system 100B shows all the potential locations that the ECC logic circuitry can be located within integrated circuit device 101. In one example, an ECC logic circuitry 118c can be located within the cache memory 104, an ECC logic circuitry 118d can be located within the cache memory 106, an ECC logic circuitry 118a can be located within the memory controller 114, an ECC logic circuitry 118b can be located within the memory device 116, an ECC logic circuitry 118e can be located within the data mover circuitry 110, and/or an ECC logic circuitry 118f can be located within the processing core 108. As will be described in more detail below, the location(s) of the ECC logic circuitry, whether the ECC logic circuitry is enabled, and/or how many ECC data bits are added to a data transmission are determined based on the fault tolerance of the computing system 100. In another example, ECC logic circuitry is included one, all, or none of the data paths based on the fault tolerance of the computing system 100.

Figure 1C:
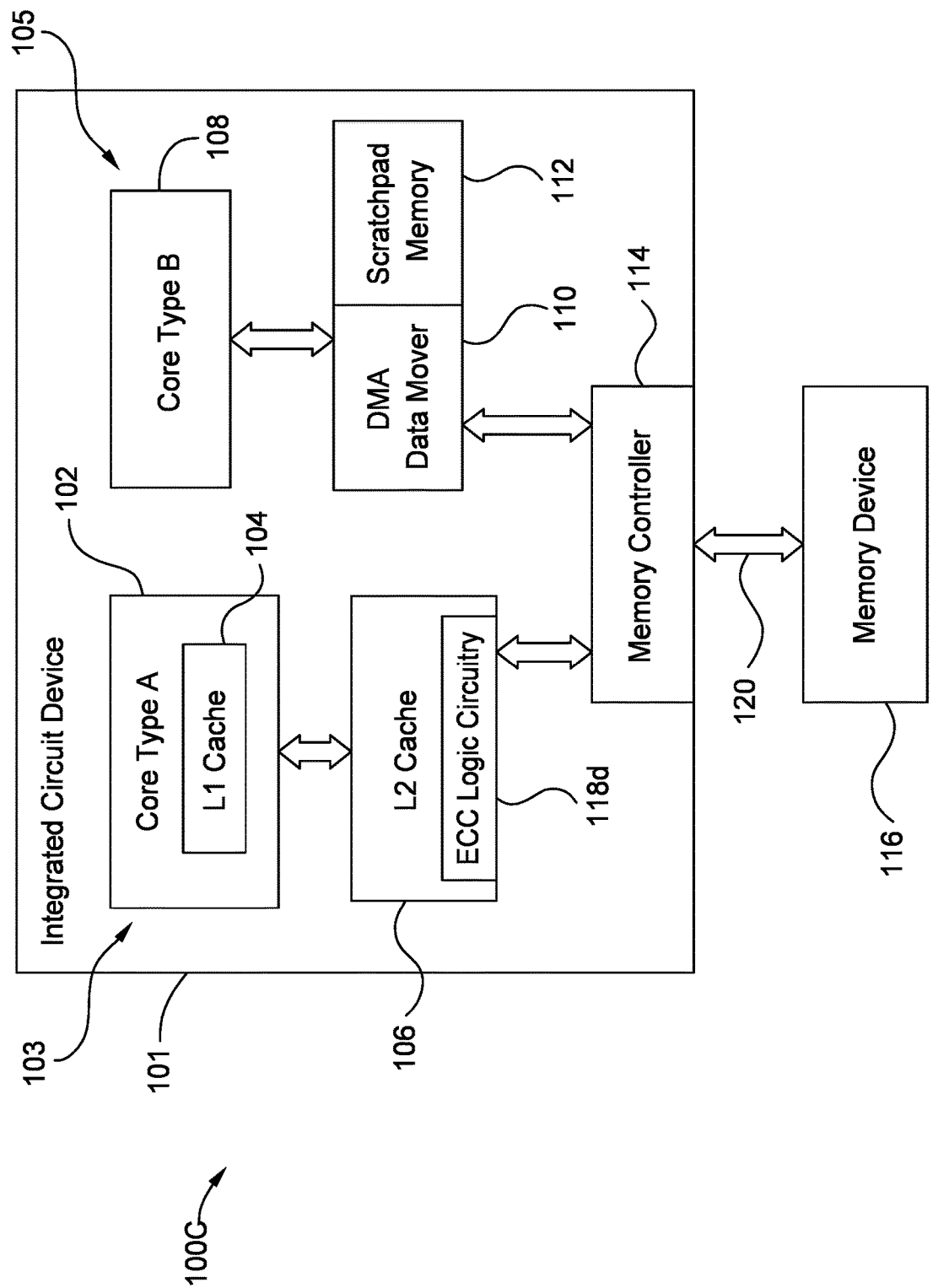
FIG. 1C illustrates an exemplary computing system according to one or more examples.

FIG. 1C illustrates an exemplary computing system 100C according to one or more examples. In one example, the ECC logic circuitry 118d is included in the first data path 103 and within the cache memory 106. As described above, this is for example purposes only, and an ECC logic circuitry can be located at every or none of the locations on the first data path 103 and/or second data path 105 described in FIG. 1B above.

Figure 1D:
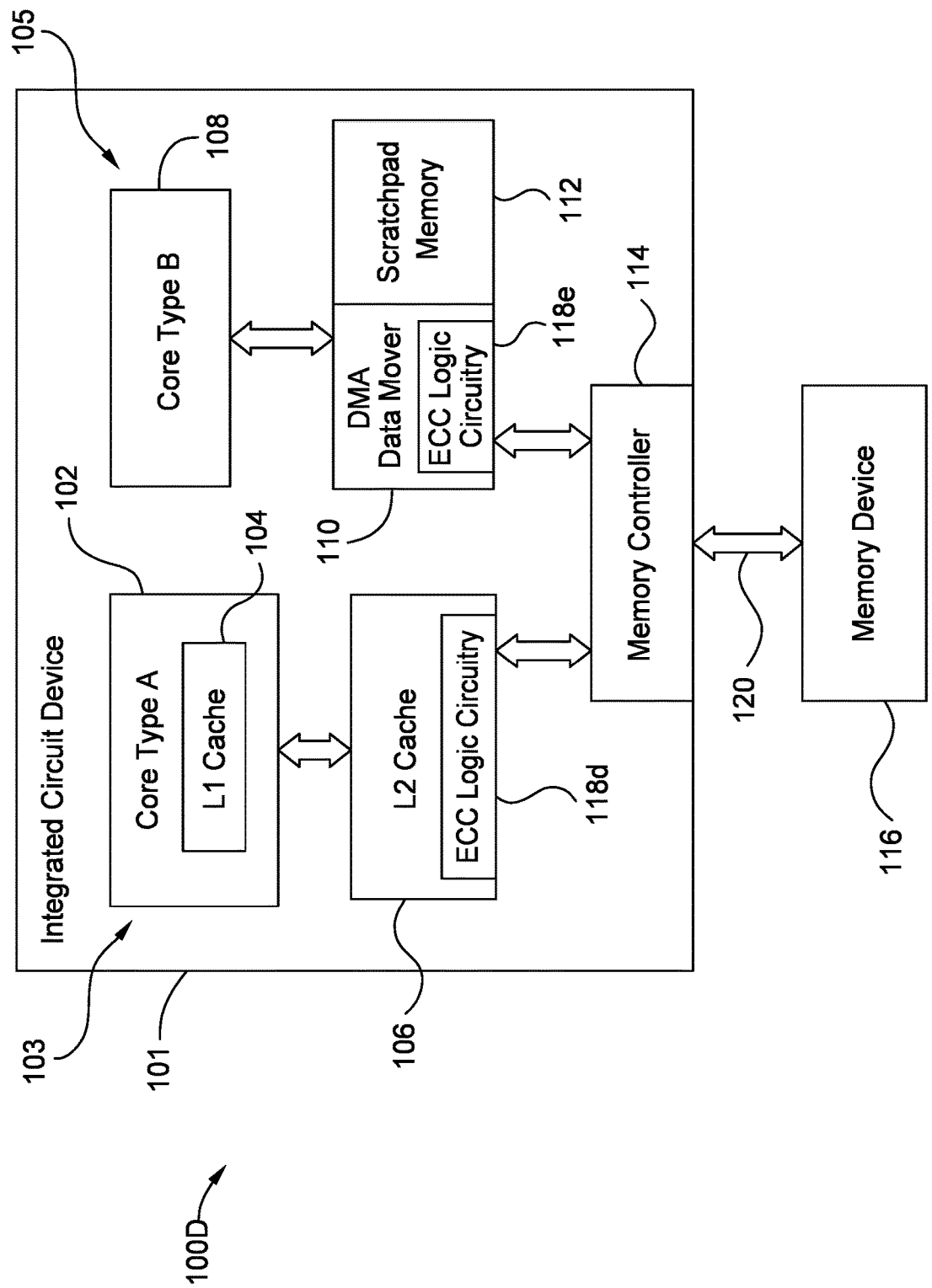
FIG. 1D illustrates an exemplary computing system according to one or more examples.

FIG. 1D illustrates an exemplary computing system 100D according to one or more examples. In one example, the ECC logic circuitry 118d is included on the first data path 103 and the ECC logic circuitry 118e is included on the second data path 105. The ECC logic circuitry 118d is located within the cache memory 106 and the ECC logic circuitry 118e is located within the data mover circuitry 110. In one example, based on the fault tolerance of each core, the ECC logic circuitry can be controlled differently on each path. For example, the ECC logic circuitry 118d on the first data path 103 provides full ECC protection, while the ECC logic circuitry 118e on the second data path 105 provides partial ECC protection (or vice versa). Stated differently, the ECC logic circuitry 118d on the first data path 103 will provide ECC protection to each data bit, while the ECC logic circuitry 118e on the second data path 105 will provide ECC protection to data bits with low fault tolerances. Stated differently, the ECC logic circuitry 118e on the second data path 105 will add less ECC bits to the data transmission format used along the second data path 105 which allows more room for data bits. Therefore, the processing core 108 includes more data bits in the data transmission (i.e., reclaims the unused ECC bits). Thus, the data transmission format used on the second data path 105 has a higher data bit to ECC bit ratio than the data transmission format on the first data path 103. In another example, the ECC logic circuitry 118d on the first data path 103 and the ECC logic circuitry 118e on the second data path 105 use different forms of partial ECC protection (i.e., different quantities of ECC bits are reclaimed on each data path). As described above, this is for example purposes only and the ECC logic circuitry can be located at every or none of the locations on the integrated circuit device 101 as described in FIG. 1B above.

Figure 1E:
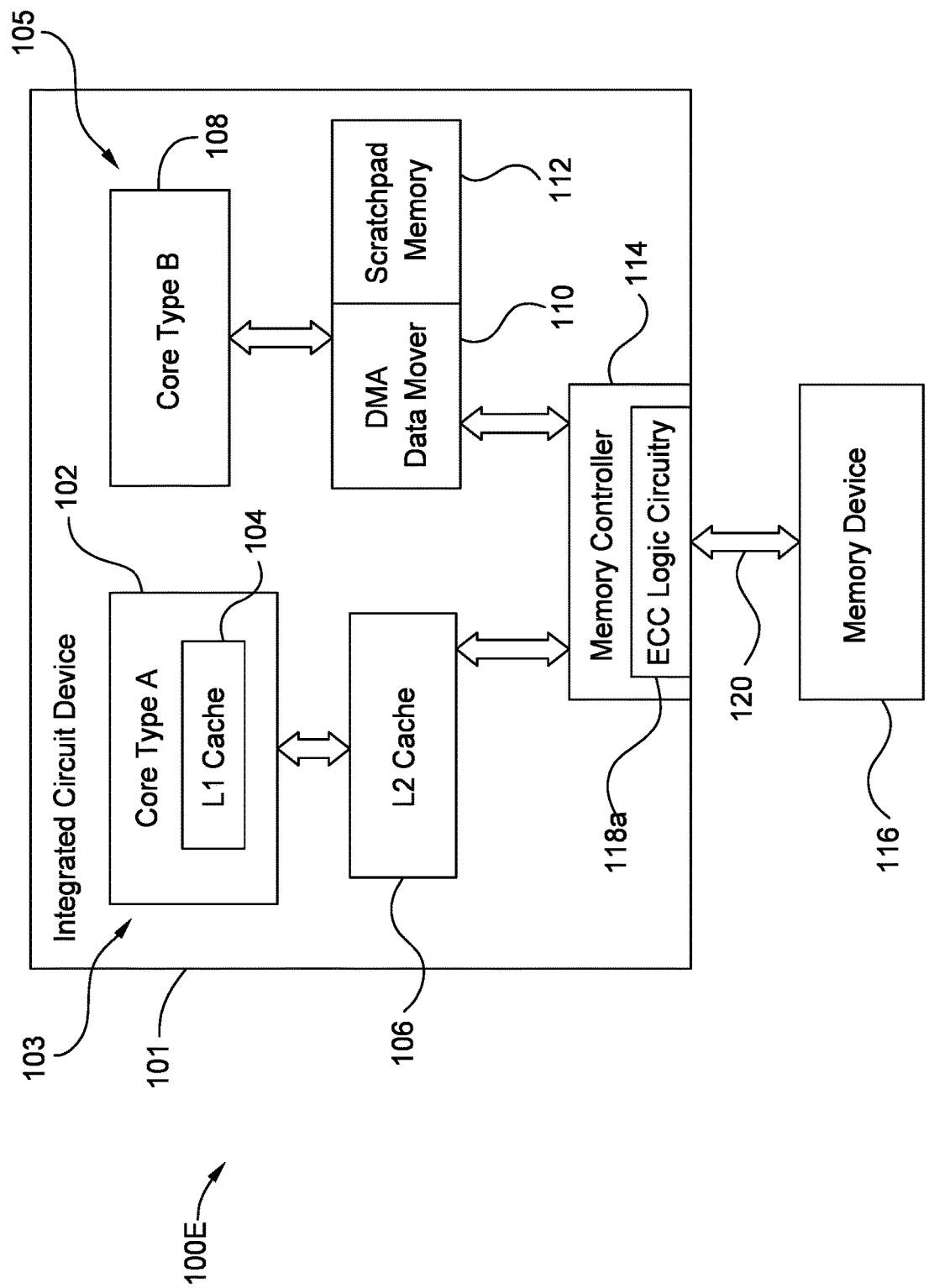
FIG. 1E illustrates an exemplary computing system according to one or more examples.

FIG. 1E illustrates an exemplary computing system 100E according to one or more examples. In one example, the ECC logic circuitry 118a is included within the memory controller 114. In one example, the ECC logic circuitry 118a in the memory controller 114 is configurable. Stated differently, the memory controller 114 can make a decision on how to format a data transmission dynamically (during run-time) based on the data bits in the data transmission. For example, the memory device 116 can dynamically configure the ECC logic circuitry 118a to provide different levels of ECC protection based on an indicated memory address in the data bits, a core ID, or the like. For example, based on the memory address range or the core ID, the memory controller 114 can decide whether to use full, partial, or zero ECC protection during processing.

For example, the different ranges of addresses in the memory device 116 could be flagged for different levels of ECC protection. In one example, the memory controller 114 can categorize the addresses of the memory device 116 into three ranges. In one example, during a write command, if the data transmission includes an address within a first range of addresses in the memory device 116, the memory controller 114 will configure the ECC logic circuitry 118a to provide full ECC protection. If the data transmission includes an address within a second range of addresses in the memory device 116 the memory controller 114 will configure the ECC logic circuitry 118a to provide partial ECC protection. If the data transmission includes an address within a third range of addresses in the memory device 116 the memory controller 114 will disable the ECC logic circuitry 118a. Although three different ranges of memory addresses are described as receiving different levels of ECC protection, this is for example purposes only. It is understood, that specific addresses could be flagged for different levels of ECC protection, or that the addresses of the memory device 116 can be categorized into more or less than three ranges each with different levels of ECC protection. For example, two different ranges of addresses can receive different levels of partial ECC protection. Stated differently, while both ranges of addresses receive ECC protection. This will be described in more detail below.

Figure 2:
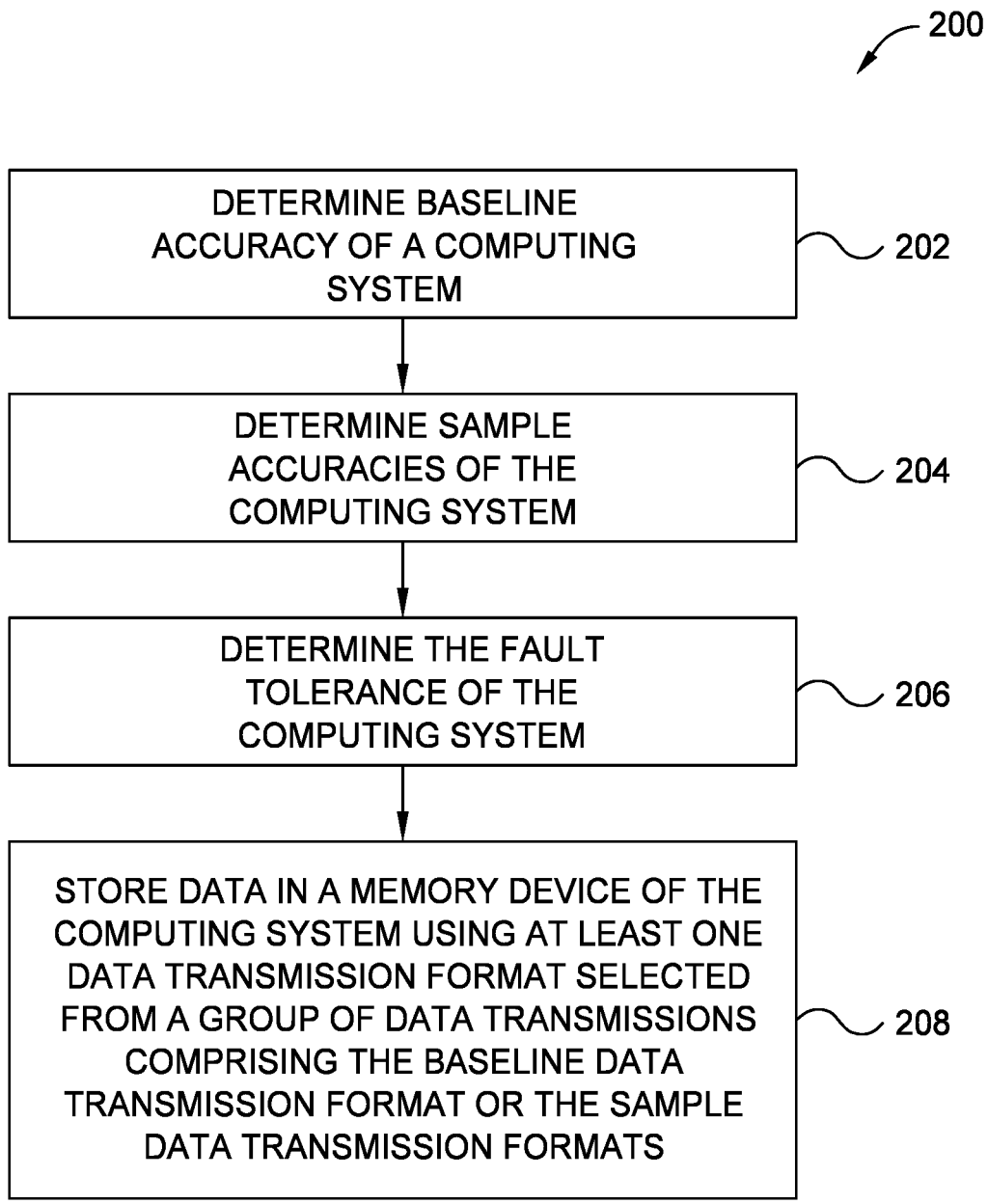
FIG. 2 illustrates a method for reclaiming error correction control (ECC) bits based on the fault tolerance of the computing system, according to one or more examples.

FIG. 2 illustrates a method 200 for reclaiming ECC bits based on the fault tolerance of the computing system 100, according to one or more examples. FIG. 2 is described with reference to FIGS. 1A-1E. Method 200 is described with reference to a ML system. Although FIG. 2 is described with reference to a ML system, it is understood that the method 200 can be performed for any system that implements memory.

At block 202 of the method 200, a baseline accuracy of a computing system, such as computing system 100A, 100B, 100C, 100E, or 100D, is determined. The baseline accuracy of the computing system is determined by operating an IC system (or computing system), such as computing system 100A, 100B, 100C, 100E, or 100D using bassline data transmissions having baseline data transmission formats. The baseline data transmission format is a data transmission format including a baseline quantity of bits. The baseline quantity of bits includes a baseline ratio of data bits to ECC bits according to a standard protocol. Stated differently, the baseline accuracy is determined by transmitting data transmissions having a data transmission format that follows a standard protocol through the computing system. For example, if the baseline data transmission format length is 72-bits, 64 bits include data bits and 8 bits include ECC bits according to a standard protocol. Although a standard protocol with 8 ECC bits for every 64 data bits is described, this is for example purposes only. Standard protocols with other ratios of ECC bits to data bits can be used. The computing system is operated using data transmissions having baseline data transmission formats according to the standard protocol while the baseline accuracy of the computing system is determined. As described above, in one example, the baseline accuracy may be correlated based on each data path. For example, a separate baseline accuracy is determined for data transmissions having a core ID corresponding to the processing core 102 and for data transmissions having a core ID corresponding to the processing core 108. In another example, different baseline accuracies are determined for baseline data transmissions that are designated and stored in different memory addresses of the memory device 116.

At block 204 of the method 200, sample accuracies of the computing system 100 are determined. Sample accuracies of the computing system 100 are determined by operating an IC system (or computing system), such as computing system 100A, 100B, 100C, 100E, or 100D using sample data transmissions having sample data transmission formats. The sample data transmission formats include, but are not limited to, data transmission formats having different ratios of data bits to ECC bits and/or different overall quantities of bits. Separate sample accuracies for the sample data transmission formats are determined in the same manner as the baseline accuracy. For example, a separate sample accuracy is determined for sample data transmissions having a core ID corresponding to the processing core 102 and for data transmissions having a core ID corresponding to the processing core 108. In another example, different sample accuracies are determined for sample data transmissions that designate and are stored in different memory addresses of the memory device 116.

The sample data transmission formats include, but are not limited to, data transmission formats having zero ECC bits or a reduced quantity of ECC bits (i.e., partial ECC protection). Each of the ECC bits that are not used are reclaimed as data bits. Stated differently, each ECC bit that is reclaimed is replaced with a data bit. Sample data transmissions having different sample data transmission formats are transmitted through the computing system and sample accuracies for the sample data transmission formats are determined.

For example, if sample data transmission formats are 72-bits in length and standard protocols require 8 ECC bits, sample data transmission formats may include, but are not limited to: 72 data bits with 0 ECC bits, 68 data bits with 4 ECC bits, 70 data bits with 2 ECC bits, or the like. In more complex data transmission format types, ECC bits can also be repositioned to protect a subset of data bits within sample data transmission formats. In complex data transmission format types, different data bits have different fault tolerances.

In another example, sample data transmission formats include data transmissions that are aggregated into blocks of data. In more complex data transmission formats, such as floating point data type formats, the computing system 100 can be more tolerant to faults on some bits rather than others.

Figure 3:
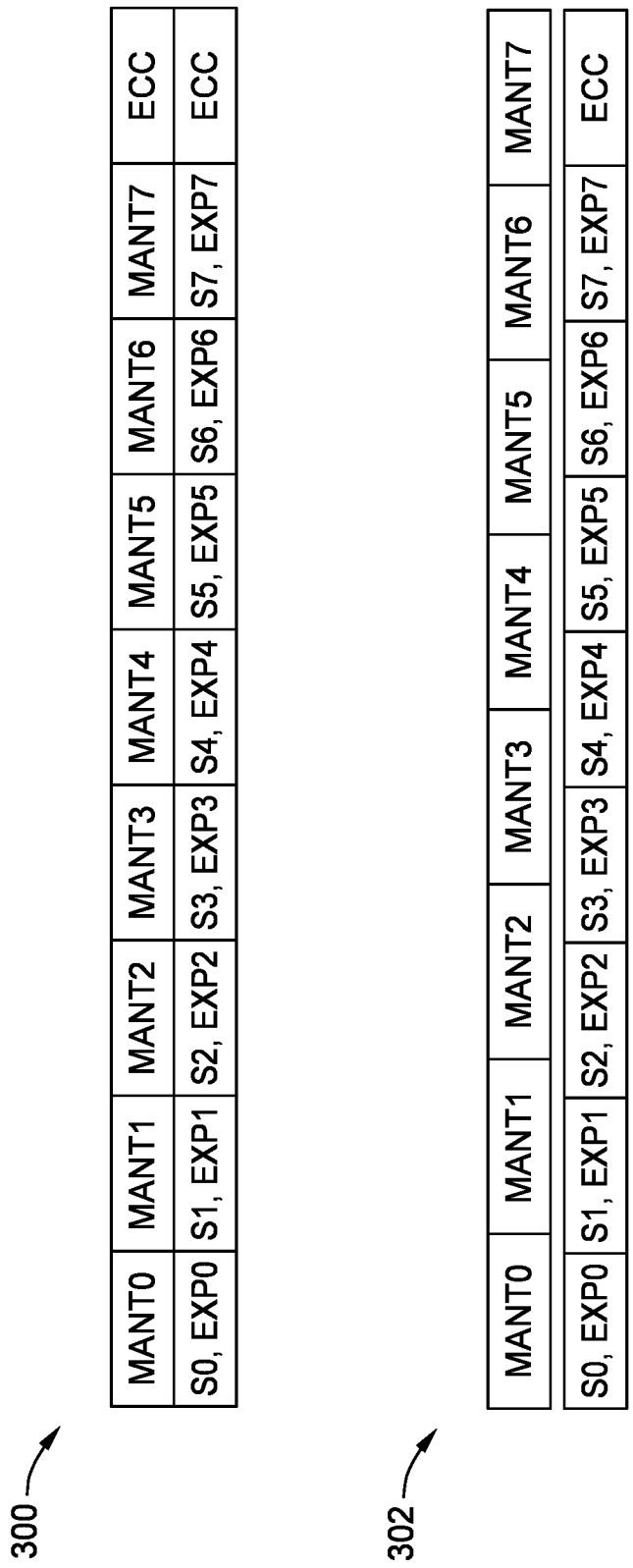
FIG. 3 illustrates an example sample data transmission format that includes multiple data transmissions aggregated into a block of data along with reclaimed ECC bits, according to one or more examples.

FIG. 3 illustrates an example sample data transmission format 302 that includes multiple data transmissions aggregated into a block of data along with reclaimed ECC bits, according to one or more examples. In one example, the aggregated data transmissions have a 16-bit floating point type data transmission that includes 1 sign bit, 7 exponent bits, and eight mantissa bits (i.e., a {1,7,8} format). Standard data transmission format 300 illustrates multiple aggregated data transmissions having a {1,7,8} format aggregated into a block of data. For example, 8 {1,7,8} format floating point type transmissions (i.e., 16 bit words) can be aggregated into a 144 bit block of data. Standard data transmission format 300 includes 16 fields that are each 8 bits in length. 8 fields include the mantissa bits of each data transmission (MANT0-MANT7) with MANT0 corresponding to the mantissa of a first data transmission, MANT1 corresponding to the mantissa of a second data transmission, and so on. 8 fields of data include a sign bit (S0-S7) and 7 exponent bits (EXP0-EXP7) for each data transmission with S0 and EXP0 corresponding to the sign bit and exponent bits of the first data transmission, S1 and EXP1 corresponding to the sign bit and exponent bits of the second data transmission, and so on. In one example, because a standard protocol that uses a 64 data bits to 8 ECC bits ratio is used, the 144 bit block of data would include 128 data bits and 16 ECC bits. Therefore, there are also 2 fields that each include 8 bits of ECC data.

As described above, different bits may be more sensitive to faults (i.e., the fault tolerance of sign bits vs. exponent bits vs. mantissa bits). In one example, for an ML system, as described above, the sign and exponential bits have a low fault tolerance, while the mantissa bits have a high fault tolerance. Therefore, a portion of the ECC bits of can be reclaimed to improve data throughput and accuracy of the computing system, while the remaining ECC bits protect the sign and exponent bits (e.g., partial ECC protection). Thus, sample data transmission format 302 includes partial ECC protection. 8 ECC bits in sample data transmission format 302 are reclaimed and the remaining 8 ECC bits provide ECC protection to the sign and exponential bits of the block of data. The 8 reclaimed ECC bits can be evenly distributed to the mantissa of each data transmission. Stated differently, each mantissa of sample data transmission format 302 are increased in length by 1 bit. Sample data transmission format 302 includes 8 17 bit data transmissions having a {1,7,9} format while the bits with a high fault tolerance are ECC protected. Advantageously, increasing the size of each mantissa by one data bit increases the accuracy of the outputs of the overall system and the throughput of the computing system while still preventing catastrophic faults. Different ratios are possible for larger blocks of data, with different combinations of protection for selections of exponent, sign, and significand digits. Even though a 16-bit floating point type data transmission is described, this is for example purposes only. ECC bits are reduced and/or repositioned in floating point data types having more or less than 16 bits, and any other format types for a data transmission.

In another example, data transmission formats types can be dominated by mantissa rather than the exponent and/or sign bit. For example, the block floating point type bfp15b16p2 (8 shared exponent bits, 16×1 sign bits, 16×6 data bits, and one prime bit per two elements) consumes a total of 128 data bits per 16 data blocks. ECC data bits can be reclaimed and an additional half-bit can be added to each element to remove the prime bit in favor of a mantissa bit, reclaiming 8 ECC bits towards the mantissa of each word. Reclaiming the 8 bits of ECC bits leaves the remaining 8 bits for protection of any selected 64 bits from the 136 bits (128 bits plus the 8 reclaimed bits) of data.

In another example, other ratios for larger blocks of data are used. For example, a "block of blocks" type in which a group of block-float numbers are aggregated, with only their exponent or exponent and sign bits protected, will have a higher ratio of ECC bits utilized for significant than for error correction by opting to protect smaller portions of the data. The ECC data bits can be positioned to protect any combination of the sign, exponent, or mantissa bit(s). For example, ECC data bits can further protect upper mantissa bits and leave lower mantissa bits unprotected.

At block 206 of the method 200, the fault tolerance of the computing system is determined. In one example, the fault tolerance of the computing system is determined based on the baseline and the sample accuracies. A fault tolerance corresponding to each data transmission format candidate (i.e., the baseline data transmission format and the sample data transmission formats) are determined. In one example, the computing system 100 is operated (i.e., the hardware and software of the computing system) using each data transmission format candidate, while random noise is injected for each specific bit of each data transmission format candidate. The impact of a fault at each bit of each data transmission format candidate is determined. In one example, the level of the fault tolerance for the expected bit error rate (BER) of the computing system 100 for each bit of each data transmission format candidate is determined. For example, the impact of faults caused by each sign bit, exponential bit, and mantissa bit of each data transmission candidate are determined. As described above different fault tolerances are determined for different core IDs and/or different addresses of memory device 116. In one example, the degree of fault tolerance of the computing system is used to determine the data transmission format and/or the level of ECC protection. In one example, the higher the fault tolerance the lower the level ECC of protection provided. The data transmission format and/or the level of ECC protection is determined based on the channel 120 noise and the quantization noise of the computing system. In one example, if the channel 120 is less noisy than the quantization then lower levels (or zero) ECC protection will be used (and vice versa)

At block 208 of the method 200, data is stored in the memory device 116 using at least one data transmission format selected from a group of data transmission formats by the integrated circuit device 101. The group of data transmission formats includes the data transmission format candidates (i.e., the baseline data transmission format and the sample data transmission formats). The at least one of the data transmission format used, the location of the ECC logic circuitry within the integrated circuit device, and/or the level of ECC protection is determined based on the fault tolerance of the accuracy associated to each data transmission format candidate. In one example, the at least one data transmission format is selected based on the baseline statistics for a fully protected computing system 100, sample statistics, and the fault tolerance for the expected BER for each bit of each data transmission format candidate. In one example, based on the fault tolerance for the expected BER for each bit, each of the bits of each data transmission format candidate are sorted from most to least sensitive, and the expected accuracy of each bit position are determined with the most sensitive bits including error protection. The data transmission format candidate(s) with the highest accuracy are selected as the data transmission formats. The location of the ECC logic circuitry within the integrated circuit device 101, and/or the level of ECC protection is determined based on the selected data transmission format(s). In one example, different data transmission formats are used for different data paths based on a core ID included in the data transmissions. Stated differently, a first data transmission format candidate for data transmissions having a core ID corresponding to the processing core 102, and a second data transmission format candidate for data transmissions having a core ID corresponding to the processing core 108 have the highest accuracies. In one example, an ECC logic circuitry 118d is included on the first data path 103 and ECC logic circuitry 118e is included on the second data path 105 that are each configured to provide different levels of ECC protection (i.e., different quantities of ECC bits are reclaimed). For example, the ECC logic circuitry 118d is located in memory cache 106 and the ECC logic circuitry 118e located in the data mover circuitry 110 (FIG. 1D). Here, the processing core 102 instructs the ECC logic circuitry 118d included in memory cache 106 to provide a first level of ECC protection. The first level of ECC protection may be full, partial, or zero ECC protection. The processing core 108 instructs the ECC logic circuitry 118e included in the data mover circuitry 110 to provide a second level of ECC protection. The second level of ECC protection may be full, partial, or zero ECC protection. The first level and the second level of ECC protection can be the same or different. In one example, the first level of ECC protection and the second level of ECC protection can be full ECC protection, zero ECC protection, or the same level of partial ECC protection. In another example the first level of ECC protection is full ECC protection while the second level of ECC protection is zero ECC protection (and vice versa). The first level of ECC protection is full ECC protection while the second level of ECC protection is partial ECC protection (and vice versa). The first level of ECC protection is zero ECC protection while the second level of ECC protection is full ECC protection (and vice versa). The first level of ECC protection is partial ECC protection while the second level of ECC protection is partial ECC protection in which different quantities of data bits are reclaimed (i.e., different quantities of ECC bits are added by the ECC logic circuitries).

In another example, based on the data transmission format(s) being used, an ECC logic circuitry 118d is included on the first data path 103 that uses partial or full ECC protection while an ECC logic circuitry is not included on the second data path 105, reclaiming all ECC bits on the second data path (or vice versa). In another example, the ECC logic circuitry 118a is included in the memory controller 114, and the memory controller 114 dynamically configures (during run time) the ECC logic circuitry to provide full, partial, or zero ECC protection based on the core ID included in a data transmission. In another example, the ECC logic circuitry 118a is included in the memory controller 114 and implements different levels of ECC protection based on the data bits of the data transmission such as the memory address of the memory device 116 included in the data transmissions. Advantageously, conditional disablement of ECC protection in the memory controller 114 allows for a hybrid uses of data protection in the computing system 100, thus allowing for, pass through of ECC bits, and delayed forward error correction (FEC). Based on the fault tolerances, a small amount of accuracy in the form of random noise from memory faults is sacrificed for an even greater increase in accuracy and throughput. However, if the BER of a system is high enough the ECC bits would remain as is because the accuracy sacrificed in the form of random noise from memory faults would outweigh the increase in accuracy from reclaiming the ECC bits.

As noted above, embodiments described herein relate to evaluating the fault tolerance of data bits, and based on the fault tolerance of data bits, determining whether to reclaim (replace) ECC bits with data bits. Advantageously reclaiming ECC bits with data bits allows for the computing system 100 to support a wider datapath and include bundled data and ECC bits beyond the bounds of the memory controller, including interconnect and memory hierarchy for improved precision, and use data transitions with nonstandard widths that have increased precision through extension of mantissa bits into ECC fields.

While the foregoing is directed to specific examples, other and further examples may be devised without departing from the basic scope thereof, and the scope thereof is determined by the claims that follow.

What is claimed is:

1. A method for operating a computing system comprising:
   determining a baseline accuracy of the computing system based on a baseline data transmission format, the baseline data transmission format comprising a baseline quantity of data bits and a baseline quantity of error correction (ECC) bits, wherein a first baseline accuracy is determined for a first group of related data of the computing system and a second baseline accuracy is determined for a second group of related data;

determining sample accuracies of the computing system based on sample data transmission formats, the sample data transmission formats each including a quantity of data bits and a quantity of ECC bits that are different from the baseline quantity of data bits and the baseline quantity of ECC bits, wherein first sample accuracies are determined for the first group of related data and second sample accuracies are determined for the second group of related data; and storing data corresponding to the first group of related data using a first data transmission format and data corresponding to the second group of related data using a second data transmission format in a memory device of the computing system, wherein the first data transmission format and the second data transmission format are selected from a group of data transmission formats consisting of the baseline data transmission format and the sample data transmission formats, and the first data transmission format is selected based on the first baseline accuracy and the first sample accuracies, and the second data transmission format is selected based on the second baseline accuracy and the second sample accuracies.

2. The method of claim 1, wherein the quantities of ECC bits in the sample data transmission formats are less than the baseline quantity of ECC bits, and the quantities of data bits in the sample data transmission formats are greater than the baseline quantity of data bits.

3. The method of claim 1, wherein the quantity of ECC bits in a first sample data transmission format of the sample data transmission formats is zero.

4. The method of claim 1, wherein at least one sample data transmission format of the sample data transmission formats comprises data transmissions aggregated into a block of data, the block of data including partial ECC protection.

5. The method of claim 4, wherein the partial ECC protection comprises ECC bits configured to protect sign and exponent bits of the block of data.

6. The method of claim 1, wherein at least one sample data transmission format of the sample data transmission formats is a block floating point type format, the block floating type format including partial ECC protection.

7. An integrated circuit device comprising:
a first ECC logic circuitry disposed on a first data path of the integrated circuit device, the first ECC logic circuitry configured to reclaim a portion of error correction (ECC) bits of a data transmission based on a fault tolerance of data bits of the data transmission, wherein the integrated circuit device is coupled to a memory device and configured to transmit the data transmission to the memory device, wherein the first ECC circuitry is configured to reclaim a first quantity of ECC bits based on a first baseline accuracy and first sample accuracies corresponding to a first group of related data if the data transmission includes the first group of related data, and reclaim a second quantity of ECC bits based on a second baseline accuracy and second sample accuracies corresponding to a second group of data if the data transmission includes the second group of related data.

8. The integrated circuit device of claim 7, wherein the first ECC logic circuitry is included within a memory controller of the integrated circuit device and the memory controller is configured to dynamically configure the first ECC logic circuitry to reclaim different quantities of ECC bits of the data transmission.

9. The integrated circuit device of claim 7, wherein the first ECC logic circuitry is positioned on a first data path of the integrated circuit device and is configured to reclaim a different quantity of ECC bits than a second ECC logic circuitry positioned on a second data path of the integrated circuit device.

10. The integrated circuit device of claim 7, wherein the first ECC logic circuitry is configured to reclaim the portion of ECC bits in the data transmission based on a bit error rate (BER) corresponding to each bit of the data transmission.

11. A computing system comprising:
an integrated circuit device coupled to a memory device, the integrated circuit device comprising:
a first ECC logic circuitry configured to reclaim a first portion of error correction (ECC) bits of a data transmission based on a first baseline accuracy and first sample accuracies corresponding to a first group of related data if the data transmission includes the first group of related data, and reclaim a second portion of ECC bits from the data transmission based on a second baseline accuracy and second sample accuracies corresponding to a second group of related data if the data transmission includes the second group of related data;
and transmit the data transmission to the memory device.

12. The computing system of claim 11, further comprising a memory controller, wherein the first ECC logic circuitry is included within the memory controller and the memory controller is configured to dynamically configure the first ECC logic circuitry to reclaim different quantities of ECC bits of the data transmission.

13. The computing system of claim 11, wherein the first ECC logic circuitry is positioned on a first data path and is configured to reclaim a different quantity of ECC bits than a second ECC logic circuitry positioned on a second data path.

14. The computing system of claim 11, wherein the first ECC logic circuitry is configured to reclaim the portion ECC bits in the data transmission based on a bit error rate (BER) of the computing system corresponding to each bit of the data transmission.

* * * * *